United States Patent [19]

Cerefice et al.

[11] 3,929,711

[45] Dec. 30, 1975

[54] DICYCLOHEXADIENE TETRAACYL COMPOUNDS

[75] Inventors: Steven A. Cerefice, Naperville; Ellis K. Fields, River Forest, both of Ill.

[73] Assignee: The Standard Oil Company, Chicago, Ill.

[22] Filed: Oct. 12, 1973

[21] Appl. No.: 405,837

[52] U.S. Cl. ................ 260/31.8 B; 260/31.8 DA; 260/31.8 P; 260/346.6; 260/468 G; 260/514 G
[51] Int. Cl.² .................. C08K 5/12; C08L 27/06
[58] Field of Search ........ 260/346.6, 31.8 B, 31.8 P, 260/31.8 DA, 468 G

[56] References Cited
UNITED STATES PATENTS

| 2,653,948 | 9/1953 | Dazzi | 260/31.8 B |
|---|---|---|---|
| 3,152,172 | 10/1964 | Roberts et al. | 260/468 G |
| 3,419,513 | 12/1968 | Dill | 260/31.8 B |
| 3,452,083 | 6/1969 | Dombro | 260/468 G |
| 3,522,277 | 7/1970 | Suter et al. | 260/468 G |

OTHER PUBLICATIONS

Alder et al., *Chem. Abstracts,* Vol. 50, (1956), pp. 10058–10061.
Badische Anilin & Soda-Fabrik A.G., *Chem. Abstracts,* Vol. 63, (1965), p. 11389.
Ciba Ltd., *Chem. Abstracts,* Vol. 58, p. 4704.

*Primary Examiner*—Allan Lieberman
*Attorney, Agent, or Firm*—William Magidson; Arthur G. Gilkes; William T. McClain

[57] ABSTRACT

Dicyclohexadiene tetraacyl compounds.

5 Claims, No Drawings

DICYCLOHEXADIENE TETRAACYL COMPOUNDS

This invention relates to dicyclohexadiene tetraacyl compounds. More particularly, this invention relates to dicyclohexadiene dianhydrides, dicyclohexadiene tetracarboxylic acid esters and dicyclohexadiene tetracarboxylic acids.

There has been considerable interest in organic acids having more then two acyl

groups. These polyfunctional acyl compounds have been used to produce alkyds, amide-imides and plasticizers having exceptional properties.

The object of this invention is to provide a new class of polyfunctional acyl compounds. Another object of this invention is to provide new plasticized resinous polymers of vinyl chloride. Other objects appear hereinafter.

For the purpose of this invention, the term acyl is used in a generic sense to include carbacyl compounds, such as free acids

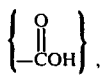

acid salts, esters, acyl halides, amides, imides, anhydrides, etc.

We have now found that it is possible to produce a new class of tetrafunctional acyl compounds. These compounds are dicyclohexadienes having acyl functionality in four positions on the cyclohexadiene nucleus. As indicated above, these compounds can be used to produce alkyds, amide-imides, polyamides, plasticizers, etc.

In oversimplified form, these compounds may be viewed as Diels-Alder dimers of the corresponding dihydrophthalic acid derivatives. However, as explained below, only the dicyclohexadiene anhydrides are formed by dimerization and the other tetraacyl compounds are preferably produced from the dianhydrides. The dianhydrides have the structures:

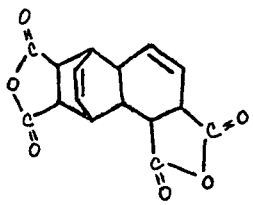

A

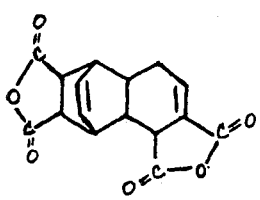

B

Structure B differs from structure A in that structure B contains a conjugated ethylenic double bond (alpha, beta to an acyl group) whereas the corresponding double bond in structure A is beta-gamma to the same acyl group. As indicated below, the position of the ethylenic double bond is dependent upon the starting materials and reaction conditions. Structure A has the systematic name tricyclo [6.2.2.0$^{2,7}$] dodeca-3,9-diene-5,6,11,12-tetracarboxylic dianhydride and structure B has the name tricyclo [6.2.2.0$^{2,7}$] dodeca-4,9-diene-5,6,11,12-tetracarboxylic dianhydride. For convenience these compounds are referred to hereinafter as dicyclohexadiene dianhydrides.

Broadly speaking, the dicyclohexadiene dianhydrides are produced by dissolving the 1,2- or 1,4-dihydrophthalic acids or anhydrides in a solvent to form a 1 to 90 percent by weight solution. The solution is heated to a temperature of about 100° to 300°C either under reflux conditions or in a pressure reactor. In general, it is preferred to carry out the reaction at 110° to 150°C., particularly when acetic anhydride is at least one component of the solvent. The reaction can be carried out for about 1 to 100 hours or more. Other things being equal, the longer the reaction time, the better the yield. In those cases where one or more dihydrophthalic acids are used, the acids are converted to anhydride groups before dimerization. After the dimerization reaction is completed, the dicyclohexadiene dianhydrides can be precipitated from the reaction mixture by cooling to ambient temperature. In some cases precipitate forms during dimerization. The insoluble dicyclohexadiene dianhydrides can then be partitioned from the solvent by filtration or centrifugation.

The anhydride having structure A can be produced by dimerizing either 1,2-dihydrophthalic acid or 1,2-dihydrophthalic anhydride or mixtures of the two materials. The anhydride having structure B can be obtained by reacting (1) substantially equal molar concentrations of a 1,2-dihydrophthalic acid or anhydride with a 1,4-dihydrophthalic acid or anhydride, or (2) by reacting 1,2-dihydrophthalic acid or anhydride together with a suitable isomerization catalyst to produce a mixture of 1,2-dihydrophthalic compound and 1,4-dihydrophthalic compound and reacting these isomers to produce the compound of structure B.

In somewhat greater detail, the compound of structure A can be produced by heating 1,2-dihydrophthalic anhydride or acid at a temperature of 110° to 150°C. The anhydride can be dimerized in a polar or non-polar solvent. Suitable solvents for dimerization of the anhydride include organic acids or anhydrides, such as acetic acid, propionic acid, acetic anhydride, propionic anhydride, acetic acid/acetic anhydride mixed solvents, etc.; hydrocarbons such as toluene, xylene, etc. However, best yields are obtained in anhydride solvents. If 1,2-dihydrophthalic acid is employed as the sole reactant, the reaction must be carried out in a solvent medium which promotes conversion of the dihydrophthalic acid to the anhydride. Dimerization does not take place until after anhydride ring closure. Suitable solvents for ring closure and dimerization of the 1,2-dihydrophthalic acid include organic acid anhydrides, such as acetic anhydride, propionic anhydride, acetic anhydride/acetic acid mixed solvents; organic acids which promote ring closure, such as trifluoroacetic acid, trifluoroacetic acid/acetic acid mixed solvents, etc. In general highest yields (60 to 70% based on the starting acids) of the desired dicyclohexadiene dianhydride of structure A is obtained by starting with 1,2-dihydrophthalic acid and heating the composition until dimerization is complete without any isolation or separation of the intermediate 1,2-dihydrophthalic anhydride.

The dianhydride of structure B can be produced by heating substantially equal molar quantities of a 1,2-dihydrophthalic compound and 1,4-dihydrophthalic compound (0.8 to 1.2 moles of one reactant per mole of the other) at a temperature of 110° to 150°C. As in the case of the production of the compound of structure A, the anhydrides can be reacted in any of the aforesaid polar or non-polar solvents with best results being obtained in anhydride medium, while the acids require the use of solvent mediums which promote ring closure of the vicinal carboxyl groups. Yields of about 15 to 20% have been obtained in this manner. Substantially higher yields (35 to 40%) can be obtained using a mixed catalyst of 1 to 3 mole percent (based on moles dihydrophthalic compound) $CoBr_2—2PPh_3$ and 3 to 10 mole percent $BF_3$ etherate.

If either component of the aforesaid cobaltous bromidetriphenyl phosphine boron trifluoride etherate catalyst system is added in a 1 to 10 mole percent concentration to the 1,2-dihydrophthalic acid or anhydride compositions, which normally produce the dianhydride of structure A, there is no dianhydride of structure A formed. No dianhydride is formed if boron trifluoride etherate is used alone and only about 5% by weight of the anhydride of structure B is formed if the cobaltous bromide-triphenylphosphine catalyst is used. However, about 30% yields of the compound of structure B is formed using both catalysts in a concentration of 1 to 3 mole percent cobaltous bromide-triphenylphosphine and 3 to 10 mole percent $BF_3$ etherate.

The anhydride ring of the dicyclohexadiene dianhydride, produced in any manner, can be opened by heating from 40° to 100°C. the anhydride in a 1 to 50 percent, preferably 20 to 30, by weight aqueous dispersion until the solid dissolves. The dicyclohexadiene tetracarboxylic acid cannot be isolated by driving off water but instead forms a dicarboxylic acid monoanhydride in dry form. If desired the alkali metal salts (sodium, potassium, etc.) or alkaline earth metal salts can be formed by mixing the anhydride with the appropriate aqueous hydroxide (sodium hydroxide, calcium hydroxide, etc.) or by neutralizing the aqueous dicyclohexadiene tetracarboxylic acid composition with sodium hydroxide, potassium hydroxide, ammonium hydroxide, tetramethyl ammonium hydroxide, pyridine, etc.

The dicyclohexadiene dianhydrides can be converted to amides by dispersing or dissolving the cyclohexadiene dianhydride in a suitable nitrogen containing medium, such as aqueous ammonium hydroxide, liquid or aqueous solution of primary amines (methyl amine, ethyl amine, aniline, etc.) or liquid or aqueous solutions of secondary amines (dimethyl amine, diethyl amine, N-methylaniline) etc., and heating to open the anhydride ring. Usually one carboxy group of each anhydride is converted initially to the amide form and the other carboxy group is converted to a carboxylate/salt form, i.e. half-amide. Under anhydrous conditions, continued heating of half-amides containing at least one active Zerwittinoff hydrogen bonded to nitrogen convert one of the half-amide groups to the imide. If desired polyamines containing at least one primary or secondary amine group, such as ethylene diamine, diethylene triamine, propylene diamine, N,N'-dimethylethylene diamine, etc., can be used in place of the simple primary and secondary amines.

The dicyclohexadiene tetraesters can be formed by reacting the dicyclohexadiene dianhydrides, half-anhydrides or tetraacids with at least 4 moles of an appropriate monohydroxy compound per mole dicyclohexadiene compound at from 50° to 200°C. using a conventional esterification catalyst.

Suitable monohydroxy compounds include alcohols containing from 1 to 24 carbon atoms such as methyl alcohol, ethyl alcohol, isopropyl alcohol, allyl alcohol, methallyl alcohol, n-butyl alcohol, n-hexyl alcohol, n-octyl alcohol, 2-ethylhexyl alcohol, decyl alcohol, tridecyl alcohol, stearyl alcohol, oleyl alcohol, tetracosyl alcohol; aromatic hydroxy compounds containing 6 to 24 carbon atoms, such as phenol, cresol, para-stearyl phenol, naphthol, etc. In general, the reaction vessel should contain from about 1 to 10 moles of monohydroxy compound per carboxyl equivalent in said dicyclohexadiene compound.

Suitable esterification catalysts include sulfuric acid, phosphoric acid, para-toluene sulfonic acid, benzene sulfonic acid, stannous octoate, etc. In general, the acid catalyst can comprise from about .01 to 5 parts by weight per 100 parts by weight of dicyclohexadiene compound.

In somewhat greater detail the esters can be formed by dissolving the dicyclohexadiene compound in from about 1 to 10 moles of monohydroxy compound per carboxyl equivalent in said dicyclohexadiene compound. One or more monohydroxy compounds can be used to form symetrical tetraesters or mixed esters. If desired, a diluent such as a xylene or toluene may also be added to aid in the entrainment of water of esterification and to promote the esterification reaction. Either before or after the polycarboxylic acid is dissolved in a monohydroxy compound, a suitable concentration of esterification catalyst is added to the reactor.

The esterification mixture is then heated to a temperature of 50° to 200°C. either under pressure or under suitable reflux conditions for a period of time to complete the esterification. After the esterification is completed, the solution of ester in monohydroxy compound and/or diluent can be isolated by conventional means.

The dicyclohexadiene tetraesters are excellent plasticizers for resinous polymers of vinyl chloride. These esters can be used in a concentration of from about 5–300 parts by weight per 100 part by weight resinous polymer of vinyl chloride, i.e. in a plasticizing concentration. They may be used as the sole plasticizers, two or more esters may be employed together or alternatively, these esters may be used in conjunction with other conventional plasticizers such as dioctylphthalate, trioctylphosphite, epoxidized glyceride oils, etc.

The dicyclohexadiene tetraester plasticizers include tetraalkyl esters of dicyclohexadiene tetracarboxylic acid containing from 1 to 24 carbon atoms in the alkyl groups, preferably 3 to 13 carbon atoms, tetraaryl ester containing from 6 to 24 carbon atoms in the aryl groups; tetraaralkyl esters containing from 7 to 24 carbon atoms in the aralkyl groups; tetraalkenyl esters containing from 3 to 24 carbon atoms, etc. mixed esters containing residues of two or more types, etc. Suitable esters include the tetramethyl ester, tetraethyl ester, tetraallyl ester, tetra-n-butyl ester, tetra-n-octyl ester, tetra-2-ethylhexyl ester, tetratridecyl ester, tetraoctadecyl ester, tetra-tetracosyl ester, diallyl di-2-ethylhexyl ester, tetraphenyl ester, tetrabenzyl ester, tetra-(p-cresyl) ester, dibenzyl di-n-octyl ester, tetra-(p-octadecylphenyl) ester, etc.

For the purpose of this invention the term "resinous polymer of vinyl chloride" includes homopolymers of vinyl chloride, copolymers of vinyl chloride and vinyl acetate, such as the conventional 95–5 vinyl chloride/vinyl acetate copolymers, partially hydrolyzed vinyl chloride/vinyl acetate copolymers, vinyl acetate/vinyl chloride/alpha, beta-ethylenically unsaturated alpha, beta-dicarboxylic acid copolymers (such as the butyl half ester of maleic acid or dioctyl fumarate ester, etc.) etc., wherein at least 50 mole percent of the polymer constitutes vinyl chloride units.

The plasticized resinous polymers of vinyl chloride can be compounded with stabilizers, such as the organotins, barium/cadmium soaps, polyhydric alcohols, etc.; lubricants, such as fatty acids; pigments, such as zinc oxide, antimony oxide, etc. and fabricated by conventional means into films, sheets, fibers, tubes, etc.

The following examples are merely illustrative.

EXAMPLE I

Thirty-six grams of 1,2-dihydrophthalic acid was added to 50 ml acetic anhydride in a 200 milliliter flask equipped with a heating mantle, stirrer and a reflux condenser. The reactants were refluxed at 130°C. ± 10° for 15 hours. On cooling, the mixture formed white crystals, which were isolated by filtering, washing with hexane and drying. Nineteen and eight-tenth grams (62% yield) of the dicyclohexadiene dianhydride having structure A was isolated. The compound melted at 230°–233°C. The compound had IR absorption at 1855 $cm^{-1}$ and 1785 $cm^{-1}$ (carbonyl peaks) and no absorption at around 1665 $cm^{-1}$ (the conjugated double bond peak). Elemental Analysis was:

|  | Carbon | Hydrogen |
| --- | --- | --- |
| Theoretical | 64.00 | 4.03 |
| Actual | 64.26 | 4.02 |

Essentially the same results were obtained using 1,2-dihydrophthalic anhydride in place of the acid.

When acetic anhydride was replaced with (a) acetic acid, (b) toluene and (c) xylene, and the mixture heated to reflux there was no dimerization.

when 1,2-dihydrophthalic anhydride was used in place of the acid, acetic anhydride was replaced with (a) acetic acid, (b) toluene and (c) xylene and the mixture heated to reflux, dicyclohexadiene dianhydride of structure A was obtained in yields of (a) 41%, (b) 4% and (c) 21%.

EXAMPLE II

This example illustrates the production of the anhydride of structure B. One and one-hundredth grams 1,2-dihydrophthalic acid and 0.99 gram 1,4-dihydrophthalic acid were refluxed in 5 ml acetic anhydride in the manner described in Example 1. The solid that formed on cooling was filtered, washed with ethanol and dried yielding 0.30 grams (17% yield) of the dicyclohexadiene dianhydride of structure B which melted at 268°–270°C. The compound had IR absorption at 1837 $cm^{-1}$ and 1780 $cm^{-1}$ (carbonyl peaks) an absorption at 1655 $cm^{-1}$ (the conjugated double bond peak). Elemental Analysis was:

|  | Carbon | Hydrogen |
| --- | --- | --- |
| Theoretical | 64.00 | 4.03 |
| Actual | 63.75 | 4.23 |

EXAMPLE III

Example II was repeated using 1.01 grams 1,2-dihydrophthalic acid, 1.09 grams 1,4-dihydrophthalic acid, 5 ml acetic anhydride, 0.27 millimoles $CoBr_2.2PPh_3$ and 0.82 millimole $BF_3$ etherate yielding 0.68 gram of the dicyclohexadiene dianhydride of structure B (36% yield).

EXAMPLE IV

This example illustrates the preparation of the tetra-2-ethylhexyl ester of dicyclohexadienetetracarboxylate. One hundred eighty and eight-tenth grams of the dicyclohexadiene dianhydride of structure B, 470 grams 2-ethylhexanol, 100 ml toluene and 4.2 grams p-toluenesulfonic acid monohydrate were placed in a 2-liter, 4-neck, round-bottom flask, equipped with a gas dispersion tube, thermometer, mechanical stirrer, Dean-Stark trap, condenser, and drying tube. Nitrogen was bubbled at a rate of 100cc/min. The mixture was heated to 160° over 1 hour and kept at 160°–165° for 1 hour, then heated at 170°–175° for an additional hour. The theoretical amount of water (22ml) was collected. The resulting yellow solution was cooled to 90° and calcium oxide (9g), water (18ml), and activated charcoal (8g) were added. The mixture was heated at 110°–120° for 1.5 hours and filtered hot. Water, toluene, and excess 2-ethylhexanol were removed from the filtrate by distillation at up to 190°C. and 0.1 mm Hg. Four hundred thirty-five grams (93% yield based on dianhydride) of the tetra-2-ethylhexyl ester of dicyclohexadiene tetracarboxylic acid in the form of a viscous yellow oil was obtained.

EXAMPLE V

One hundred parts by weight polyvinyl chloride (Geon 102EP), 60 parts by weight of the ester produced in Example IV, 1 part by weight phosphite stabilizer (Mark C), 3 parts by weight barium/cadmium soap (Mark M) and 0.4 parts by weight stearic acid were blended in a Hobart mill, melted on a rubber mill at 330–340°F. for 10 minutes and molded into 6 × 6 × 0.40 inch sheets at 1000 psi pressure and 335°–345°F. for eight minutes. After conditioning for 24 hours at 23°C. and 50% relative humidity the sheet had 3070 psi tensile strength, 2200 psi 100% modulus, 320% elongation and Shore A 10 second hardness of 94. After 7 days at 70°C. and 95% relative humidity the sheet was clear and there was no spew. The above data indicates that tetraesters of dicyclohexadiene tetracarboxylic acids are good plasticizers for resinous polymers of vinyl chloride.

EXAMPLE VI

The tetraallyl ester was produced by the method of Example IV using 30.0 grams dicyclohexadiene anhydride, 100 grams allyl alcohol and 1.5 grams para-toluene sulfonic acid monohydrate and heating at reflux for 65 hours. The tetraester was isolated by evaporating excess alcohol, dissolving the residue in 300 ml benzene, extracting with 200 ml 5% sodium bicarbonate and 200 ml water and drying. Forty-four and four-tenth grams (90% yield) of the tetraester as a yellow oil was obtained.

The tetraallyl ester can be used as a polyester crosslinker in the same manner as diallyl phthallate and triallyl phosphate. If desired, it can be epoxidized by treatment with peracetic acid or converted to the chlorohydrin with hypochlorous acid and cyclized with base to the epoxide. The epoxidized esters can be used as stabilizer/plasticizers for resinous polymers of vinyl chloride.

We claim:

1. A composition comprising a resinous polymer of vinyl chloride containing at least 50 mol percent vinyl chloride units and from 5 to 300 parts by weight of a tetra ester of dicylohexadiene tetracarboxylic acid per 100 parts by weight resinous polymer of vinyl chloride, wherein the ester moieties of said tetra ester are selected from at least one member of the class consisting of alkyl groups containing from 1 to 24 carbon atoms, aryl groups containing from 6 to 24 carbon atoms, aralkyl groups containing from 7 to 24 carbon atoms and alkenyl esters containing from 3 to 24 carbon atoms.

2. The composition of claim 1, wherein said resinous polymer of vinyl chloride is a homopolymer.

3. The composition of claim 1, wherein said tetraester is a tetraalkyl ester containing from 4 to 13 carbon atoms in each alkyl group.

4. The composition of claim 3, wherein said tetraester is the tetra-2-ethylhexyl ester.

5. The composition of claim 1, wherein said tetraester is the tetraallyl ester.

* * * * *